(12) United States Patent
Toh et al.

(10) Patent No.: US 6,313,251 B1
(45) Date of Patent: Nov. 6, 2001

(54) HIGH INDEX/HIGH ABBE NUMBER COMPOSITION

(75) Inventors: Huan Kiak Toh, Fullarton; Ian Roger Bateman, Happy Valley; David Robert Diggins, Flagstaff Hill; Bohdan Grzegorz Cieslinski, Noarlunga Downs, all of (AU)

(73) Assignee: Sola International Holdings, Ltd. (AU)

( * ) Notice: Subject to any disclaimer, the term of this patent is extended or adjusted under 35 U.S.C. 154(b) by 0 days.

(21) Appl. No.: 09/408,391

(22) Filed: Sep. 28, 1999

Related U.S. Application Data

(63) Continuation-in-part of application No. 08/975,105, filed on Nov. 20, 1997, which is a continuation-in-part of application No. PCT/AU96/00314, filed on May 24, 1996.

(30) Foreign Application Priority Data

May 30, 1995 (AU) .................................................. PN3234
Dec. 22, 1995 (AU) .................................................. PN7263

(51) Int. Cl.$^7$ ........................... C08F 265/04; C08F 20/18
(52) U.S. Cl. ...................... 526/308; 526/312; 526/321; 526/323.2; 526/286; 528/375; 528/376
(58) Field of Search .................................. 526/308, 312, 526/321, 323.2, 286; 528/375, 376

(56) References Cited

U.S. PATENT DOCUMENTS 4,131,729  12/1978  Schmitt et al. .
5,502,139  3/1996  Toh et al. .

FOREIGN PATENT DOCUMENTS

44089/89  5/1990  (AU) .
50581/93  5/1994  (AU) .

OTHER PUBLICATIONS

Derwent Abstract Accession No. 95–118718/16, Class A14, JP, A, 07041520.
Derwent Abstract Accession No. 93–131324/16, Class P81, JP, A, 05070524.
Derwent Abstract Accession No. 92–101772/13, Class P81, JP, A, 4045–401.
Derwent Abstract Accession No. 94–186824/23, Class P81, JP, A, 06123855.

*Primary Examiner*—Nathan M. Nutter
*Assistant Examiner*—Olga Asinovsky

(57) ABSTRACT

A cross-linkable polymeric casting composition including an effective amount of

- A: an acrylic or methacrylic monomer which provides high rigidity and low color dispersion (High Abbe number) to the final product;
- B: a di- or polythiol compound;
- C: a di- or polyvinyl monomer; and optionally
- D: a polymerizable comonomer.

16 Claims, No Drawings

HIGH INDEX/HIGH ABBE NUMBER COMPOSITION

CROSS-REFERENCE TO RELATED APPLICATIONS

This application is a continuation-in-part of Ser. No. 08/975,105 which was filed on Nov. 20, 1997 which is a CIP of PCT/AU96/00314, filed May 24, 1996.

The present invention relates to the manufacture of plastic optical articles such as video discs and ophthalmic lenses.

The most widely used plastic ophthalmic lens material is polymerised diethylene glycol bis (allyl carbonate). This polymer has proved a satisfactory material for the manufacture of ophthalmic lenses because of a combination of features, including excellent transmission, resistance to discolouration, high strength and high impact resistance. The material has a reasonable abrasion resistance and can be coated to improve that resistance.

Lenses formed from polymers including divinyl benzene are generally brittle and have a high yellowness index.

In Australian Patent Application 81216/87, the entire disclosure of which is incorporated herein by reference, applicant describes a cross-linkable casting composition including at least polyoxyalkylene glycol diacrylate or dimethacrylate and at least one polyfunctional unsaturated cross-linking agent. Whilst the lenses produced from the prior art compositions provide advances in the art, difficulties may be encountered in certain applications. For example, difficulties may be encountered in some patients in fitting lenses made from such compositions. Eye discomfort, including eye fatigue problems, may be encountered. Moreover, such lenses have been found to be cosmetically unattractive.

Further, in Australian Patent Application 75160/91, the entire disclosure of which is incorporated herein by reference, applicant describes a polyoxyalkylene glycol diacrylate or dimethacrylate; a monomer including a recurring unit derived from at least one radical-polymerisable bisphenol monomer capable of forming a homopolymer having a high refractive index of more than 1.55; and a urethane monomer having 2 to 6 terminal groups selected from a group comprising acrylic and methacrylic groups.

Japanese Patent Application 63-309509 to Showa Denko KK discloses the formation of a prepolymer of divinyl benzene and a polythiol compound which may be used in the formation of optical materials with high refractive indexes.

Japanese Patent Application 63-19498 to Mistubishi Gas discloses a high refractive index composition of divinyl benzene and a thiol compound. However optical lenses produced thereby exhibit unacceptable strain characteristics and cure times.

However, there remains a need in the prior art for optical articles of very high refractive indexes, high Abbe number, high rigidity, very low densities and excellent colour, that still retain excellent mechanical properties.

Accordingly, it is an object of the present invention to overcome, or at least alleviate, one or more of the difficulties related to the prior art.

Accordingly, the present invention provides a cross-linkable polymeric casting composition including an effective amount of an acrylic or methacrylic monomer which provides high rigidity and low colour dispersion (High Abbe number) to the final product;

a di- or polythiol compound;

a di- or polyvinyl monomer; and optionally a polymerisable comonomer.

The casting composition may be heat and/or UV-curable.

The optical article formed from the casting composition of the present invention may exhibit a refractive index in the high to very high-index range, high Abbe number, low density and high rigidity.

By the term "high refractive index", as used herein, we mean a polymer having a refractive index of at least approximately 1.55, preferably 1.57. By the term "very high refractive index" as used herein, we mean a polymer having a refractive index of approximately 1.59 or above, preferably 1.60 or above.

By the term "low density", as used herein, we mean a density in the range of approximately 1.15 to 1.25 g cm$^{-3}$.

By the term "Abbe number", as used herein, we mean the number expressing the extent to which the shorter and longer wavelengths of light are separated by refraction through a lens, that is the amount the lens disperses the various colours. The greater the number, the smaller the dispersion. The Abbe number may be calculated utilising the following formula:

$$v = \frac{n_D - 1}{n_F - n_C}$$

n=refractive index at the stated wavelengths below:

D=589.3 nm (sodium) yellow

F=486.1 nm blue green

C=656.3 nm red

By the term "high Abbe number" as used herein, we mean a polymer having an Abbe number of at least approximately 35, preferably 38 or above.

By the term "high rigidity" as used herein, we mean a polymer having a glass transition temperature (Tg) of at least approximately 65° C., preferably approximately 70° C., more preferably approximately 75° C. or above.

The acrylic or methacrylic monomer (Component A) may be selected from acrylates or methacrylate derivatives of a cycloolefin. An acrylate or methacrylate derivative of tricyclodecane is preferred.

The acrylate or methacrylate derivative may be of the formula:

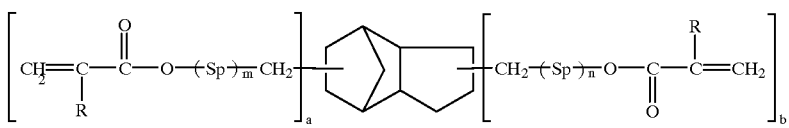

where R can be H or CH$_3$ a=1–3, b=1–3, m=–0–6, n=0–6.

Sp is a spacer group selected from one or more of the following

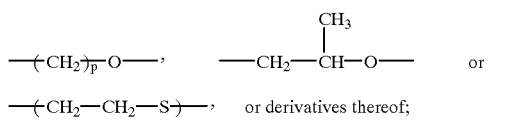

wherein p=1–4

A tricyclodecane dimethanol diacrylate or methacrylate is preferred.

A tricyclodecane dimethanol diacrylate or diacryloyl oxymethyl tricyclodecane of the following formula is preferred.

(DCPA)

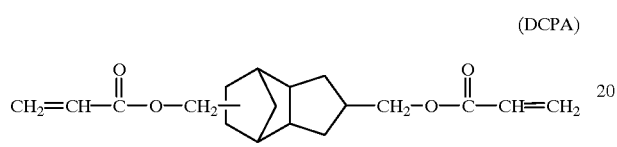

The acrylic or methacrylic monomer (Component A) may be present in amounts sufficient to provide high Abbe number and high rigidity, but not so much as to cause brittleness or low tintability. Amounts of from approximately 10 to 60% by weight, preferably approximately 30 to 55% by weight, more preferably approximately 35 to 45% by weight, based on the total weight of the casting composition have been found to be suitable.

The di- or polythiol compound (Component B) may be of any suitable type. A di-, tri- or tetra polythiol compound may be used. A tri- or tetra-polythiol is preferred. The thiol may be selected from one or more of the following:

(a) 4-mercaptomethyl-3,6-dithia-1,8-octanedithiol[MDO]

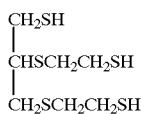

(b) Triemthylolpropane Tris(3-mercaptopropionate) [TTMP]

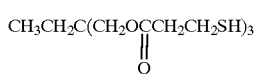

(c) Pentaerythritol Tetrakis (3-mercaptoacetate)[PTMA]

(d) Trimethylolpropane Tris(3-mercaptoacetate)[TTMA]

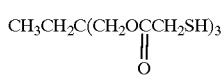

(e) 4-t-butyl-1,2-benzenedithiol

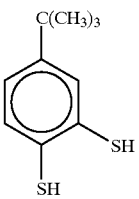

(f) Bis-(2-mercaptoethyl)sulfide HSCH$_2$CH$_2$SCH$_2$CH$_2$SH (g) 4,4'-thiodibenzenethiol

(h) benzenedithiol

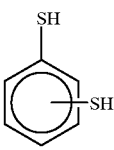

(i) Glycol Dimercaptoacetate

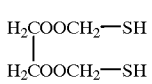

(j) Glycol Dimercaptopropionate Ethylene Bis(3-Mercaptopropionate)

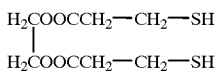

(k) Polyethylene Glycol Dimercaptoacetates

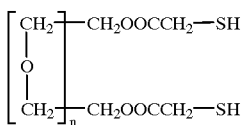

(l) Polyethylene Glycol Di(3-Mercaptopropionates)

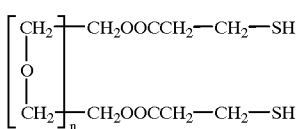

(m) Pentaerythritol Tetrakis (3-mercapto-propionate) [PTMP]

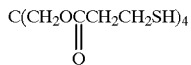

(n) Mercapto-methyl tetrahydrothiophene [MMTHT]

(o) Tris-(3-mercaptopropyl)isocyanurate [TMPIC]

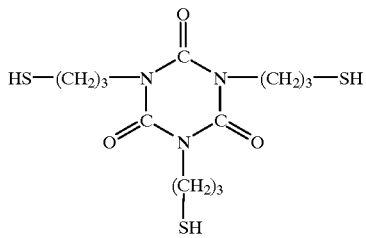

(p) 2-mercaptoethyl sulphide

(q) 1,2,3-trimercaptopropane $$\begin{array}{ccc} SH & SH & SH \\ | & | & | \\ CH_2 & CH & CH_2 \end{array}$$

(r) 2,2-bis(mercaptomethyl)-1,3-propanedithiol $$C(CH_2SH)_4$$

(s) Dipentaerythrithiol $$O[C(CH_2SH)_3]_2$$

(t) 1,2,4-trimercaptomethyl benzene

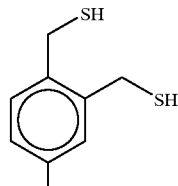

(u) 2,5-dimercaptomethyl-1,4-dithiane

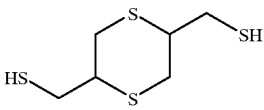

(v) BPHE-SH

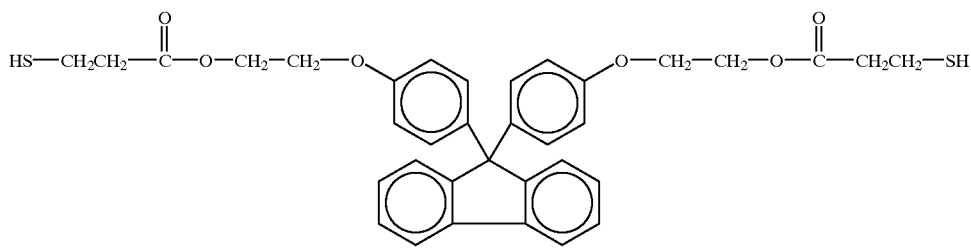

(w) 4,8-bis(mercaptomethyl)-3,6,9-trithia-1,11-undecanedithiol $$\begin{array}{cc} CH_2SH & CH_2SH \\ | & | \\ HSCH_2CH_2SCHCH_2SCH_2CHSCH_2CH_2SH \end{array}$$

(x) 2-mercaptomethyl-2-methyl-1,3-propanedithiol $$H_3CC(CH_2SH)_3$$

(y) DMDO: 1,8-dimercapto-3,6-dioxaoctane $$HSCH_2CH_2OCH_2CH_2OCH_2CH_2SH$$

4-mercaptomethyl-3,6-dithia-1,8-octanedithiol [MDO] is particularly preferred.

(z) thioglycerol bismercaptoacteate (TGBMA) (3-mercapto-1,2-bismercaptoactatylpropane

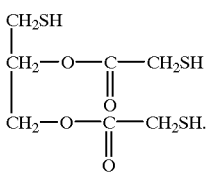

The di- or polythiol compound (Component B) may preferably be present in amounts of from approximately 15 to 60% by weight, more preferably approximately 20 to 55% by weight and particularly about 25 to 45% by weight based on the total weight of the casting composition.

The inclusion of a divinyl or polyvinyl monomer (Component C) provides a reduction in flexibility, and thus an increase in hardness in optical articles produced therefrom.

The divinyl or polyvinyl monomer may be a rigid cyclic vinyl monomer. Component C may have the following formula:

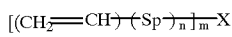

wherein

X is selected from one or more of the following

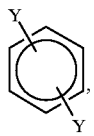 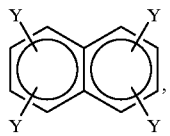

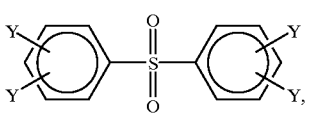

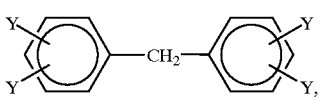 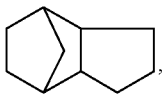

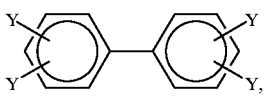

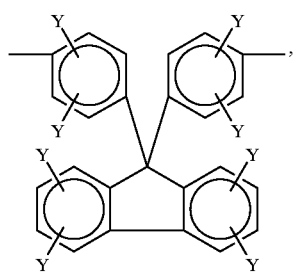 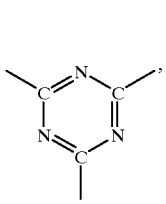

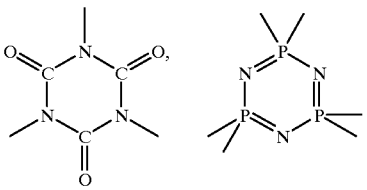

Sp is a spacer group selected from one or more of the following

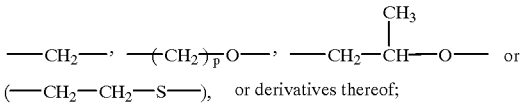

Y is hydrogen or halogen
n=0, 1 or 2
m=2–6
p=1–4

The divinyl or polyvinyl monomer may be a di- or trivinyl monomer. An aromatic divinyl is preferred. The aromatic divinyl monomer may include divinyl benzene, divinyl naphthene or derivatives thereof. 1,5-divinyl naphthene may be used. Divinyl benzene is particularly preferred.

The divinyl or polyvinyl monomer may preferably be present in amounts sufficient to provide rigidity and high index in optical articles formed from the casting composition, but not so much as to cause brittleness or low tintability. Amounts of from approximately 5 to 50% by weight, preferably approximately 15 to 40% by weight, more preferably about 20 to 30% by weight based on the total weight of the casting composition are preferred.

The cross-linkable polymeric casting composition may optionally further include a polymerisable comonomer (Component D).

The polymerisable comonomer may be selected to improve the properties and/or processability of the cross-linkable polymeric casting composition. The polymerisable comonomer may be selected to improve tint rate, hardness, abrasion resistance and the like of the resulting polymer. The polymerisable comonomer may be an unsaturated or epoxy comonomer. The polymerisable comonomer may be selected from any suitable type, e.g. methacrylates, acrylates, vinyls, vinyl ethers, allyls, epoxides, and the like.

The polymerisable comonomer may preferably be selected from one or more of epoxidised monomer or oligomer vinyls, allylics, polyoxyalkylene glycol di-, tri-, tetra- and higher acrylates or methacrylates, polymerisable bisphenol monomers, urethane monomers having 2 to 6 terminal acrylic or methacrylic groups, fluorene acrylates or methacrylates, and thioacrylate or thiomethacrylate monomers.

Where an epoxidised monomer or oligomer is included, the epoxidised monomer may function to improve curing and casting characteristics. The epoxidised monomer or oligomer may fall into one or more of the following classes: internal, terminal, mono-functional, di-functional, tri-functional, tetra-functional, aliphatic, aromatic, cyclic, structurally simple, structurally complex, esters, ethers, amines. An epoxidised soybean material may be used. The epoxidised monomer or oligomer may be selected from one or more of the following 1) Epoxidised soybean oil—Triglycerides of a mixture of epoxidised a) oleic acid, b) linoleic acid, c) linolinic acid

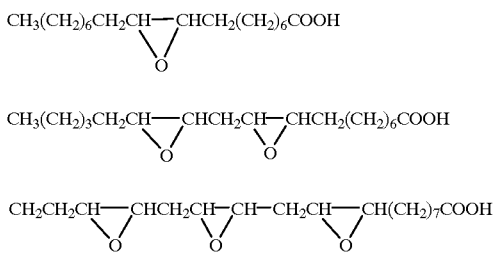

2) Propylene Oxide

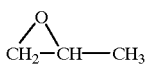

3) Hexanediol diglycidyl ether (HDGE)

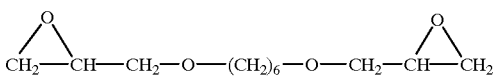

4) 1,2 epoxy butane

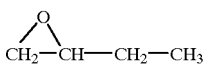

5) Bisphenol fluorene diglycidyl ether (BPGE)

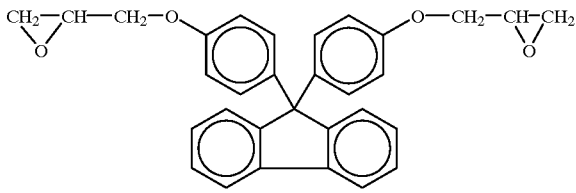

6) Epolight 100MF

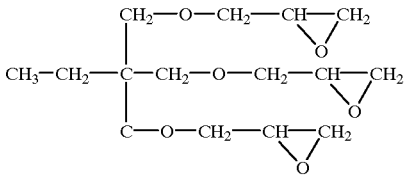

7) AK-601

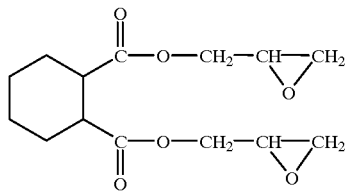

8) MY 721

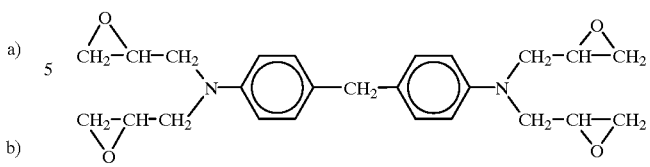

The epoxidised monomer may be present in amounts of from approximately 0.001% to 10% by weight, preferably 0.01% to 5%, more preferably approximately 0.01% to 2%, based on the total weight of the casting composition.

Where a vinyl comonomer is included, the vinyl comonomer may be selected from styrene, substituted styrenes, 3,9-divinyl-2,4,8,10-tetraoxaspiro[5.5]undecane (DTU), a divinyl ester monomer of a bi- or polycyclic compound and mixtures thereof. The divinyl ester monomer of a bi- or polycyclic compound may be of the type described in copending provisional patent application entitled "UV Curable High Index Vinyl Esters" to Applicants, the entire disclosure of which is incorporated herein by reference.

The vinyl comonomers may be present in amounts of from 0 to approximately 20% by weight, preferably approximately 5 to 15% by weight, based on the total weight of the casting composition.

Where a thiodiacrylate or dimethacrylate is included, the thiodiacrylate or dimethacrylates may be selected from bis(4-methacryloylthioethyl)sulfide (BMTES) and bis(4-methacryloylthiophenyl)sulfide (BMTS). The thioacrylate or methacrylate may be present in amounts of from 0 to approximately 20% by weight, preferably approximately 5 to 15% by weight, based on the total weight of the casting composition.

Where a fluorene diacrylate or dimethacrylate is included, the fluorene diacrylate or dimethacrylate monomer may be selected from a bisphenol fluorene dihydroxy acrylate (BFHA) or a bisphenol fluorene dimethacrylate (BFMA) or mixtures thereof.

The fluorene diacrylate or dimethacrylate monomer may be present in amounts of from 0 to approximately 20% by weight, preferably approximately 1 to 10% by weight.

The polyoxy alkylene glycol diacrylate or dimethacrylate compound according to the present invention, when present, may include ethylene oxide or propylene oxide repeating units in its backbone. A polyethylene glycol dimethacrylate is preferred. Suitable materials include dimethylacrylates where the number of repeating ethylene oxide groups is between 4 and 14. Suitable materials include those sold under the trade names NK Ester 4G, 6G, 9G or 16G. A 9G monomer is preferred.

The polyoxy alkylene glycol diacrylate or dimethacrylate component may be present in amounts of from 0 to approximately 20% by weight, preferably approximately 5% to 15% by weight, based on the total weight of the casting composition.

The high index bisphenol monomer component in the cross-linkable casting composition when present may be selected from: dimethacrylate and diacrylate esters of bisphenol A; dimethacrylate and diacrylate esters of 4,4'bishydroxy-ethoxy-bisphenol A and the like.

Preferred high index bisphenol compounds include bisphenol A ethoxylated dimethacrylate and tetra brominated bisphenol A ethoxylated dimethacrylates. A bisphenol A ethoxylate dimethacrylate sold under the trade designation ATM 20 by Ancomer has been found to be suitable.

The high index bisphenol monomer may be present in amounts of from 0 to approximately 20% by weight, preferably 5 to 15% by weight based on the total weight of the casting composition.

The highly rigid acrylic or methacrylic monomer (Component D), when present, may be selected from highly rigid, high Abbe No. polyfunctional acrylates or methacrylates. Pentaerythritol tetracrylate (PTA) is a preferred example.

The highly rigid acrylic or methacrylic monomer (Component D) may be present in amounts sufficient to provide high Abbe number and high rigidity, but not so much as to cause brittleness or low tintability. Amounts of from approximately 0 to 20% by weight, preferably approximately 2.5 to 15% by weight, more preferably approximately 2.5 to 10% by weight, based on the total weight of the casting composition have been found to be suitable.

The cross-linkable casting composition according to the present invention may include a polymerisation curing agent.

The polymerisation curing agent may be a radical heat cationic or radical initiator. A radical heat initiator is preferred. The compositions may be cured by a combination of UV radiation and heat.

The amount of curing agent may vary with the monomers selected. It has been possible to operate with a relatively low level of curing agent of between approximately 0.05 and 1.5%, preferably 0.4% to 1.0% by weight.

The following curing agents have been found to be suitable.

AIBN (Azo radical heat initiator) Azodiisobutyronitrile
Trigonox TX-29 (Dialkyl Peroxide radical heat initiator) 1,1-di-(-butyl peroxy-3,3,5-trimethyl cyclohexane)
TBPEH (Alkyl Perester radical heat initiator) t-butyl per-2-ethylhexanoate
(Diacyl Peroxide radical heat initiator) Benzoyl Peroxide
(Peroxy Dicarbonate radical heat initiator) Ethyl Hexyl Percarbonate
(Ketone Peroxide radical heat initiator) Methyl ethyl ketone peroxide
Cyracure UV1-6974 (cationic photoinitiator) Triaryl sulfonium hexafluoroantimonate
Lucirin TPO (radical photoinitiator) 2,4,6-Trimethylbenzoyldiphenylphosphine oxide
Vicure 55 (radical photoinitiator) methyl phenylglycoxylate
Bis(t-butyl peroxide) diisopropylbenzene
t-butyl perbenzoate
t-butyl peroxy neodecanoate
Amicure DBU
Amicure BDMA
DABCO Amicure DBU and/or Amicure BDMA are preferred.

Initiator may be a single component or combination of initiator components.

Other additives may be present which are conventionally used in casting compositions such as inhibitors, dyes, UV stabilisers and materials capable of modifying refractive index. Mould release agents may be added. Such additives may include:

UV Absorbers Including
    Ciba Geigy Tinuvin P—2(2'-hydroxy-5'methyl phenyl)benzotriazole
    Cyanamid Cyasorb UV 531—2-hydroxy-4-n-octoxybenzophenone
    Cyanamid Cyasorb UV5411—2(2-hydroxy-5-t-octylphenyl)-benzotriazole
    Cyanamid UV 2098—2 hydroxy-4-(2-acryloyloxyethoxy)benzophenone
    National Starch and Chemicals Permasorb MA—2 hydroxy-4-(2 hydroxy-3-methacryloxy)propoxy benzophenone
    Cyanamid UV24—2,2'-dihydroxy-4-methoxybenzophenone
    BASF UVINUL 400—2,4 dihydroxy-benzophenone
    BASF UVINUL D-49—2,2'-dihydroxy-4,4' dimethoxybenzophenone
    BASF UVINUL D-50—2,2',4,4' tetrahydroxy benzophenone
    BASF UVINUL D-35—ethyl-2-cyano-3,3-diphenyl acrylate
    BASF UVINUL N-539—2-ethylhexyl-2-cyano-3,3-diphenyl acrylate
    Ciba Geigy Tinuvin 213
Hindered Amine Light Stabilisers (HALS), Including
    Ciba Geigy Tinuvin 765/292-bis(1,2,2,6,6-pentamethyl-4-piperidyl)sebacate
    Ciba Geigy 770—bis(2,2,6,6-tetramethyl-4-piperidinyl)sebacate
Antioxidants Including
    Ciba Geigy Irganox 245—triethylene glycol-bis-3-(3-tertbutyl4-hydroxy-5-methyl phenyl)propionate
    Irganox 1010—2,2-bis[[3-[(3,4-bis(1,1-dimethylethyl)-4-hydroxyphenyl]-1-oxopropoxy]methyl]-1,3-propanediyl 3,5-bis(1,1-dimethylethyl)-4-hydroxy benzene propanoate
    Irganox 1076—octadecyl 3-(3',5'-di-tert-butyl(-4'-hydroxyphenyl)propionate
Anticolouring Agents Including
    9, 10 dihydro-9-oxa-10-phosphaphenanthrene-1-oxide
Cure Modifiers Including
    Dodecyl mercaptan
    Butyl mercaptan
    Thiophenol
    Nitroso compounds such as Q1301 from Wako
    Nofmer from Nippon Oils and Fats Other monomeric additives can be present in amounts up to 10% by weight as viscosity modifiers, and include monomers such as methacrylic acid, vinyl silanes, and other functional monomers. Other monomeric additives may be included to improve processing and/or material properties, these include:
    methacrylic acid, maleic anhydride, acrylic acid
    adhesion promoters/modifiers such as Sartomer 9008, Sartomer 9013, Sartomer 9015 etc.
    dye-enhancing, pH-adjusting monomers like Alcolac SIPOMER 2MIM
    a charge-reducing cationic monomer to render the material more antistatic, example Sipomer Q5-80 or Q9-75
    mould release agents such as Phosphoric acid esters, e.g. octyl acid phosphate, etc, Alkyl quaternary ammonium salts, e.g. cetyl trimethyl ammonium bromine, etc., Zonyl Series, e.g. Zonyl FSO 100, Zonyl FSN 100, etc., Zelec Series, e.g. Zelec DP, Zelec UN, etc., and Unidain DS Series, e.g. DS 401, DS 202, etc.

The crosslinkable polymeric casting composition according to the present invention may be utilised in the preparation of an optical article. The optical article may be characterised by having an increased very high refractive index and Abbe number relative to known prior art articles. The optical article may exhibit excellent colour and low density.

In a preferred aspect of the present invention there is provided a method for preparing a polymeric article which method includes providing a cross-linkable polymeric casting composition including an effective amount of
- A: an acrylic or methacrylic monomer which provides high rigidity and low colour dispersion (High Abbe number) to the final product;
- B: a di- or polythiol compound;
- C: a di- or polyvinyl monomer; and optionally
- D: a polymerisable comonomer; and a heat and/or UV curing agent;

mixing the polymeric casting composition and curing agent; and subjecting the mixture to a cross-linking step.

The casting composition may be formed into a suitable article by mixing in a convenient vessel the components making up the material, and then adding the curing catalyst. The mixed material may then be degassed or filtered. As the curing time is substantially reduced, the casting process may be undertaken on a continuous or semi-continuous basis.

In a further aspect of the present invention there is provided a polymeric article prepared by the method as described above.

The polymeric article may be an optical article. The optical article may provide characteristics equal to or greater than those achievable with articles made from diethylene glycol bis(allyl carbonate) but with a considerably reduced cure time and substantially increased throughput. The optical article may be further characterised by having reduced weight and/or thickness relative to the prior art, excellent optical properties provided by the high rigidity, high Abbe number, very low Yellowness Index and low density, whilst retaining good abrasion resistance and impact resistance.

The overall refractive index may be in the high to very high refractive index range of approximately 1.58 to 1.70, preferably 1.59 to 1.65.

Accordingly in a further preferred aspect of the present invention there is provided an optical article having a high Abbe number and high to very high refractive index in the range of from approximately 1.58 to 1.70 prepared from a cross-linkable polymer casting composition including an effective amount of
- A: an acrylic or methacrylic monomer which provides high rigidity and low colour dispersion (High Abbe number) to the final product;
- B: a di- or polythiol compound;
- C: a di- or polyvinyl monomer; and optionally
- D: a polymerisable comonomer.

The optical articles prepared by the method of this invention include camera lenses, ophthalmic lenses and video discs.

The present invention will now be more fully described with reference to the accompanying examples. It should be understood, however, that the description following is illustrative only and should not be taken in any way as a restriction on the generality of the invention described above.

EXAMPLE 1

A cross-linkable casting composition having the following components was prepared

|  | Percent |
|---|---|
| Diacryloyl oxymethyl tricyclodecane (DCPA) | 32 |
| 4-mercaptomethyl-3,6-dithia-1,8-octanedithiol (MDO) | 31 |
| Divinyl Benzene | 21 |
| Pentaerythritol tetracrylate (PTA) | 16 |
|  | 100 |

The monomer mix was prepared in a beaker together with any suitable free radical initiator, for example 1.0% Trigonox TX29.

The casting material was used to fill the space between a pair of glass moulds separated by a plastic gasket at their periphery and held together by a clip. Cure time was 8 hours with heating at a temperature of 40 to 120° C. A satisfactory lens having a high Abbe number of 42 and high refractive index was formed.

Examples 2 to 24 and Comparative Examples 1 to 3

The procedure of Example 1 was repeated utilising the components set out below. Results are given in Tables 1, 2 and 3 below.

TABLE 1

| | Formulations | | | | | | | | | Properties | | |
|---|---|---|---|---|---|---|---|---|---|---|---|---|
| No. | DCPA | PTA | DCPM | A9300* | DVB | MDO | MMTHT | Component D | Epoxy Compound | R1 | Abbe No. | Tg (° C.) |
| 1. | 32 | 16 | | | 21 | 31 | | | | 1.60 | 42 | 90 |
| 2. | 32 | 11 | | | 26 | 31 | | | | 1.60 | 41 | 94 |
| 3. | 46 | | | | 27 | 27 | | | | 1.60 | 41 | 103 |
| 4. | 43 | | | | 28 | 29 | | | | 1.60 | 40 | 91 |
| 5. | 15 | 32 | | | 22.5 | 30.5 | | | | 1.60 | 41 | 108 |
| 6. | 15 | 33 | | | 22 | 30 | | | | 1.60 | 41 | 104 |
| 7. | 45 | | | | 25 | 25 | | 3** (ATM20) | 2***(Epolight 100 MF) | 1.60 | 40 | — |
| 8. | 32 | 14 | | | 23 | 31 | | | | 1.60 | 41 | 91 |
| 9. | 39 | 10 | | | 20 | | 31 | | | 1.59 | 42 | 113 |
| 10. | 47 | | | | 26 | 27 | | | | 1.60 | 41 | 91 |
| 11. | 35 | | | 18 | 14 | 33 | | | | 1.60 | 42 | 67 |
| 12. | 41.5 | 2.5 | | | 27 | 29 | | | | 1.60 | 40 | 92 |
| 13. | 37 | 7.5 | | | 25.5 | 30 | | | | 1.60 | 40.5 | 90 |
| 14 | 34 | 10 | | | 25 | 31 | | | | 1.60 | 41 | 88 |

TABLE 1-continued

| | Formulations | | | | | | | | | Properties | | |
|---|---|---|---|---|---|---|---|---|---|---|---|---|
| No. | DCPA | PTA | DCPM | A9300* | DVB | MDO | MMTHT | Component D | Epoxy Compound | RI | Abbe No. | Tg (° C.) |
| 15 | 34 | 15.5 | | | 20.5 | 30 | | | | 1.60 | 42 | 89 |
| 16 | 35 | 16 | | | 17 | 32 | | | | 1.60 | 42.5 | 75 |
| 17 | 30.5 | 19 | | | 19.5 | 31 | | | | 1.59 | 42 | 90 |
| 18 | 15 | 32 | | | 22 | | 31 | | | 1.60 | 42.5 | 80 |
| 19 | 48 | | | | 24.5 | 27.5 | | | | 1.60 | 41.5 | 90 |
| 20 | 20 | 15 | | | 33 | 32 | | | | 1.607 | 38.3 | 108 |
| 21 | 32 | | | | 36 | 27 | | 5****(9G) | | 1.602 | 38.5 | |
| 22 | 10 | 25 | | | 30 | 35 | | | | 1.608 | 38.5 | 102 |
| 23 | | 35 | 7 | | 20 | 38 | | | | 1.604 | 40.4 | |
| 24 | 22.5 | 17.5 | | | 25 | 35 | | | | 1.605 | 39.5 | 78 |
| 14 | 34 | 10 | | | 25 | 31 | | | | 1.60 | 41 | 88 |
| 15 | 34 | 15.5 | | | 20.5 | 30 | | | | 1.60 | 42 | 89 |
| 16 | 35 | 16 | | | 17 | 32 | | | | 1.60 | 42.5 | 75 |
| 17 | 30.5 | 19 | | | 19.5 | 31 | | | | 1.59 | 42 | 90 |
| 18 | 15 | 32 | | | 22 | | 31 | | | 1.60 | 42.5 | 80 |
| 19 | | 45 | | | 22 | 33 | | | | 1.60 | 40.2 | 90 |
| 20 | 48 | | | | 24.5 | 27.5 | | | | 1.60 | 41.5 | 90 |
| 21 | | | 43.5 | | 26.5 | 30 | | | | 1.60 | 39.5 | 88 |
| 22 | 20 | 15 | | | 33 | 32 | | 5****(9G) | | 1.607 | 38.3 | 108 |
| 23 | 32 | | | | 36 | 27 | | | | 1.602 | 38.5 | |
| 24 | 10 | 25 | | | 30 | 35 | | | | 1.608 | 38.5 | 102 |
| 25 | | 40 | | | 20 | 40 | | | | 1.606 | 40 | 78 |
| 26 | | 35 | 7 | | 20 | 38 | | | | 1.604 | 40.4 | |
| 27 | 22.5 | 17.5 | | | 25 | 35 | | | | 1.605 | 39.5 | 78 |

| | Formulations | | | | | | | | | Properties | | |
|---|---|---|---|---|---|---|---|---|---|---|---|---|
| No. | DCPA | PTA | DCPM | A9300* | DVB | MDO | MMTHT | Component D | Epoxy Compound | RI | Abbe No. | Tg (° C.) |
| 25 | 16 | 24 | | | 25 | 35 | | | | 1.604 | 39.6 | 90 |
| 26 | 33.0 | 15.0 | — | | 22.0 | 30.0 | | | | 1.595 | 41.2 | 86 |
| 27 | 29.5 | 19.0 | — | | 20.0 | 31.5 | | | | 1.595 | 40.9 | 88 |
| 28 | 10.0 | 38.0 | — | | 16.5 | 35.5 | | | | 1.597 | 40.8 | 85 |
| 29 | 18.5 | 29.5 | — | | 18.5 | 33.5 | | | | 1.597 | 41.4 | 88 |
| 30 | 12.5 | — | 35 | | 20.5 | 32.0 | | | | 1.593 | 41.8 | 90 |
| 31 | 35.0 | 14.5 | | | 20.5 | 30.0 | | | | 1.593 | 42.1 | 90 |
| 32 | 49.0 | 0.0 | — | | 22.0 | 29.0 | | | | 1.595 | 41.6 | 75 |
| 33 | 15.0 | 33.0 | 0 | | 18.0 | 34.0 | | | | 1.597 | 41.0 | 86 |
| 34 | — | — | 50 | | 20 | 30 | | | | 1.590 | 40.3 | 79 |

*A9300
**ATM20
*** 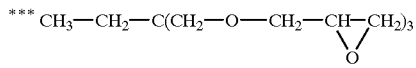
****NK Ester 9G = polyethylene glycol dimethacrylate
DCPM = Dimethyloltricyclodecane dimethyacrylate

TABLE 2

| | Formulations | | | | | | | Properties | | |
|---|---|---|---|---|---|---|---|---|---|---|
| No. | DVB | TMPT | PETP | BMME | PETG | DME | MDO | RI | Abbe No. | Tg (° C.) |
| 1 | 35 | | | | | | 65 | 1.66 | 29 | <30 |
| 2 | 70 | | | | 25 | 5 | | 1.614 | 31 | |
| 3 | 70 | | 20 | 10 | | | | 1.625 | 30 | |

TMPT = trimethylolpropane tris(β-thiopropionate)
PETP = pentaerythritol tetrakis (β-thiopropionate)
BMME = 1,4-bis (mercaptomethyl) benzene
PETG = pentaerythritol tetrakis (β-thioglycolate)
DME = 1,2-dimerdaptoethane

TABLE 3

| No. | DCPA | PIA | CDPM | A9300* | DVB | MDO | MMTHT | TGBMA | PTMA | Compound D | Epoxy Compound | R1 | Abbe No. | Tg (° C.) |
|---|---|---|---|---|---|---|---|---|---|---|---|---|---|---|
| 1 | 16.5 | | | 17 | 28 | | | 38.5 | | | | 1.593 | 39 | 96 |
| 2 | 18 | | | | 16.5 | 27.5 | | 38 | | | | 1.592 | 39 | 94 |

Finally, it is to be understood that various other modifications and/or alterations may be made without departing from the spirit of the present invention as outlined herein.

What is claimed is:

1. A cross-linkable polymeric casting composition that comprises:

A: an acrylic or methacrylic monomer that is selected from an acrylate or a methacrylate derivative of a cycloolefin which provides high rigidity and low colour dispersion and is characterized by an Abbe number of at least 35 in the final product;
   B. a di- or polythiol compound;
   C. a di- or polyvinyl monomer; optionally
   D. a polymerisable comonomer;

wherein component C is a rigid cyclic vinyl monomer of the formula

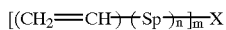

wherein

X is selected from one or more of the following:

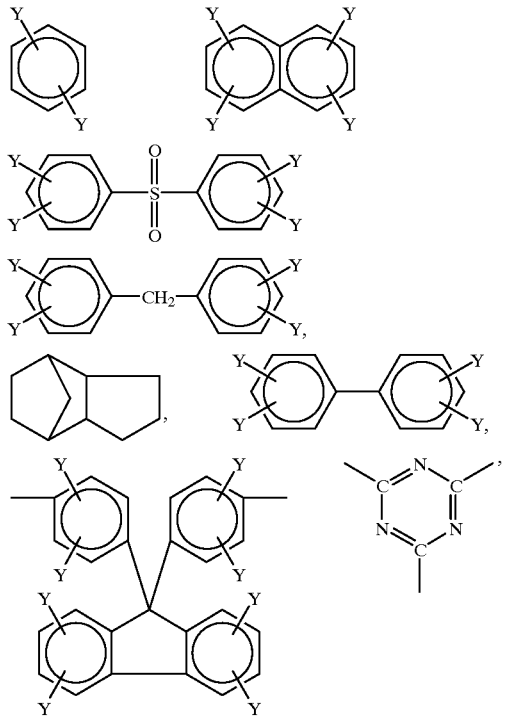

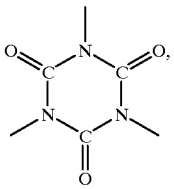
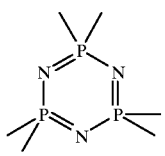

Sp is a spacer group selected from one or more of the following:

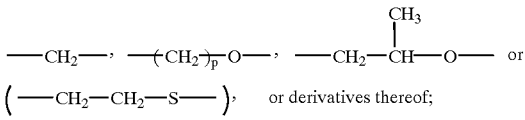

Y is hydrogen or halogen
n=0, 1 or 2
m=2–6
p=1–4.

2. A cross-linkable polymeric casting composition according to claim 1, wherein the divinyl or polyvinyl monomer is an aromatic divinyl monomer selected from the group consisting of divinyl benzene, divinyl naphthene or derivatives thereof.

3. A cross-linkable polymeric casting composition according to claim 1, wherein component C is present in amounts of from approximately 5 to 50% by weight, based on the total weight of the casting composition.

4. A cross-linkable polymeric casting composition according to claim 3, wherein component C is present in amounts of from approximately 15 to 40% by weight, based on the total weight of the casting composition.

5. A cross-linkable polymeric casting composition according to claim 1 wherein the aromatic divinyl monomer is divinyl benzene.

6. A cross-linkable polymeric casting composition according to claim 2 wherein the aromatic divinyl monomer is divinyl benzene.

7. A cross-linkable polymeric casting composition according to claim 3 wherein the aromatic divinyl monomer is divinyl benzene.

8. A cross-linkable polymeric casting composition according to claim 4 wherein the aromatic divinyl monomer is divinyl benzene.

9. A cross-linkable polymeric casting composition according to claim 1 wherein the cross-linkable polymeric casting composition includes the polymerisable comonomer.

10. A cross-linkable polymeric casting composition according to claim 2 wherein the cross-linkable polymeric casting composition includes the polymerisable comonomer.

11. A cross-linkable polymeric casting composition according to claim 3 wherein the cross-linkable polymeric casting composition includes the polymerisable comonomer.

12. A cross-linkable polymeric casting composition according to claim 4 wherein the cross-linkable polymeric casting composition includes the polymerisable comonomer.

13. A cross-linkable polymeric casting composition according to claim 5 wherein the cross-linkable polymeric casting composition includes the polymerisable comonomer.

14. A cross-linkable polymeric casting composition according to claim 6 wherein the cross-linkable polymeric casting composition includes the polymerisable comonomer.

15. A cross-linkable polymeric casting composition according to claim 7 wherein the cross-linkable polymeric casting composition includes the polymerisable comonomer.

16. A cross-linkable polymeric casting composition according to claim 8 wherein the cross-linkable polymeric casting composition includes the polymerisable comonomer.

* * * * *